US012688669B2

(12) United States Patent
Yang et al.

(10) Patent No.: US 12,688,669 B2
(45) Date of Patent: Jul. 21, 2026

(54) OPTICAL DETECTION DEVICE OF DETECTING WHETHER A TARGET OBJECT HAS DIFFERENT SURFACE TREATMENT FEATURES AND METHOD OF FORMING MARKERS

(71) Applicant: PixArt Imaging Inc., Hsin-Chu City (TW)

(72) Inventors: Chung-Ting Yang, Hsin-Chu City (TW); Kai-Ho Tsai, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 297 days.

(21) Appl. No.: 18/383,452

(22) Filed: Oct. 24, 2023

(65) Prior Publication Data

US 2025/0131687 A1    Apr. 24, 2025

(51) Int. Cl.
| | |
|---|---|
| *G06V 10/60* | (2022.01) |
| *G06T 7/13* | (2017.01) |
| *G06V 10/141* | (2022.01) |
| *G06V 10/44* | (2022.01) |
| *G06V 10/75* | (2022.01) |
| *G06V 10/764* | (2022.01) |

(52) U.S. Cl.
CPC ............... *G06V 10/60* (2022.01); *G06T 7/13* (2017.01); *G06V 10/141* (2022.01); *G06V 10/44* (2022.01); *G06V 10/751* (2022.01); *G06V 10/764* (2022.01)

(58) Field of Classification Search
CPC ........ G06T 7/13; G06V 10/60; G06V 10/141; G06V 10/751; G06V 10/44; G06V 10/764
See application file for complete search history.

(56) References Cited

U.S. PATENT DOCUMENTS

| | | | | |
|---|---|---|---|---|
| 6,750,466 B2 * | 6/2004 | Guha | ..................... | G01N 21/89 |
| | | | | 250/559.46 |
| 11,068,740 B2 * | 7/2021 | Hyland | ................... | G06F 18/25 |
| 12,260,581 B2 * | 3/2025 | Konishi | ................. | G06V 20/59 |
| 2006/0054608 A1 * | 3/2006 | Cahill | .................... | B23K 26/04 |
| | | | | 257/E23.179 |
| 2006/0177137 A1 * | 8/2006 | Friedhoff | ............... | G06V 10/60 |
| | | | | 382/199 |
| 2011/0013002 A1 * | 1/2011 | Thompson | ............. | A61B 5/445 |
| | | | | 382/128 |
| 2013/0021461 A1 * | 1/2013 | Zahniser | .............. | G06V 20/695 |
| | | | | 382/128 |
| 2013/0027540 A1 * | 1/2013 | Ito | ....................... | G01N 15/1433 |
| | | | | 348/79 |
| 2013/0215257 A1 * | 8/2013 | Huang | ................. | G06F 3/0317 |
| | | | | 348/86 |

(Continued)

*Primary Examiner* — Shaghayegh Azima
(74) *Attorney, Agent, or Firm* — Winston Hsu

(57) ABSTRACT

An optical detection device of detecting whether a target object has different surface treatment features includes an image sensor and an operation processor. The image sensor is adapted to acquire a detection image containing the target object. The operation processor is electrically connected to the image sensor, and adapted to compute variation of an image shading parameter of the detection image so as to determine whether a boundary of the surface treatment features are detected by the image sensor in accordance with the variation of the image shading parameter.

14 Claims, 5 Drawing Sheets

(56)         References Cited

U.S. PATENT DOCUMENTS

| | | | |
|---|---|---|---|
| 2014/0204187 A1* | 7/2014 | Sasaki | G06T 3/12 |
| | | | 348/65 |
| 2017/0060494 A1* | 3/2017 | Palmen | G06F 3/1215 |
| 2017/0293818 A1* | 10/2017 | Zagaynov | G06T 5/40 |
| 2017/0294017 A1* | 10/2017 | Yuan | G06T 7/0012 |
| 2018/0188027 A1* | 7/2018 | Zhang | G06T 7/11 |
| 2018/0300861 A1* | 10/2018 | Tsarenko | G06T 5/40 |
| 2019/0228507 A1* | 7/2019 | Menon | G06T 5/73 |
| 2020/0134851 A1* | 4/2020 | McQueen | G06T 7/90 |
| 2020/0158628 A1* | 5/2020 | Chen | G01N 21/8806 |
| 2020/0193212 A1* | 6/2020 | Hyland | G06V 10/80 |
| 2021/0176411 A1* | 6/2021 | Winzell | H04N 23/23 |
| 2021/0360139 A1* | 11/2021 | Mcelvain | H04N 25/583 |
| 2022/0003536 A1* | 1/2022 | Rueb | G01B 11/002 |
| 2022/0133162 A1* | 5/2022 | Jones | A61B 5/02141 |
| | | | 600/485 |
| 2022/0292648 A1* | 9/2022 | Menon | G06T 5/60 |
| 2023/0049522 A1* | 2/2023 | Flatman | H04N 23/74 |
| 2024/0046656 A1* | 2/2024 | Menaker | B60W 60/001 |
| 2024/0119702 A1* | 4/2024 | Ajgaonkar | G06V 20/52 |
| 2025/0052979 A1* | 2/2025 | Miller | G02B 7/28 |
| 2025/0060481 A1* | 2/2025 | Sadeghigooghari | G01S 17/86 |
| 2025/0348671 A1* | 11/2025 | Chaudhari | G06F 40/279 |

* cited by examiner

10

I1

I2

I3

OPTICAL DETECTION DEVICE OF DETECTING WHETHER A TARGET OBJECT HAS DIFFERENT SURFACE TREATMENT FEATURES AND METHOD OF FORMING MARKERS

BACKGROUND OF THE INVENTION

1. Field of the Invention

The present invention relates to an optical detection device, and more particularly, to an optical detection device of detecting whether a target object has different surface treatment features and a method of forming the markers.

2. Description of the Prior Art

If the conventional optical detection device intends to detect relative motion of the target object, the marker is formed on the surface of the target object, and the auto exposure mode of the optical detection device is turned off, and then the conventional optical detection device analyzes interference fringes generated by the marker to identify a movement of the target object relative to the optical detection device. One conventional marker is the dark matte layer formed on the surface of the target object; the dark matte layer is easily separated from the target object due to long-term use, and the conventional optical detection device loses its detection ability. Another conventional marker is the burned mark formed on the surface of the target object by laser etching technology; however, the laser etching technology is unstable, and sizes of several burned marks may be different from each other, which results in lower detection accuracy of the conventional optical detection device. There is still one conventional marker that uses computer numerical control technology to form the notch on the surface of the target object; the notch has the stable size but is expensive in the processing cost. Therefore, design of an optical detection device capable of accurately detecting the marker having the low manufacturing cost and the stable quality without turning off the auto exposure mode is an important issue in the related optical detection industry.

SUMMARY OF THE INVENTION

The present invention provides an optical detection device of detecting whether a target object has different surface treatment features and a method of forming the markers for solving above drawbacks.

According to the claimed invention, an optical detection device of detecting whether a target object has different surface treatment features includes an image sensor and an operation processor. The image sensor is adapted to acquire a detection image containing the target object. The operation processor is electrically connected to the image sensor, and adapted to compute variation of an image shading parameter of the detection image so as to determine whether a boundary of the surface treatment features are detected by the image sensor in accordance with the variation of the image shading parameter.

According to the claimed invention, the image shading parameter is an image contrast value or a speckle size of the detection image. The operation processor computes the variation of the image shading parameter of the detection image when an auto exposure mode of the image sensor is actuated.

According to the claimed invention, the operation processor is adapted to further compare the image shading parameter with a predefined threshold, and determine the boundary is detected by the image sensor when the image shading parameter crosses the predefined threshold. The operation processor is adapted to further compute a period length of the image shading parameter crossing the predefined threshold, and utilize the period length to acquire a size of one of the surface treatment features. The operation processor is adapted to further compute a number of times that the image shading parameter crosses the predefined threshold, and utilize the number of times to acquire a number of the boundary detected by the image sensor. The operation processor is adapted to further compute a period length of the image shading parameter crossing the predefined threshold, and utilize the period length and the number of times to acquire encode data represented by arrangement of the surface treatment features.

According to the claimed invention, the operation processor is adapted to further detect a structural feature formed on the target object for computing relative position change of the image sensor and the target object. The operation processor is adapted to further analyze and acquire an interval between plural boundaries of the surface treatment features, and utilize the interval to calibrate the relative position change.

According to the claimed invention, the operation processor is adapted to further compute a difference between a first pixel having maximum pixel intensity and a second pixel having minimum pixel intensity of the detection image for being the image shading parameter. The operation processor is adapted to further divide all pixels of the detection image into a first pixel group and a second pixel group in accordance with each pixel intensity of the foresaid all pixels, and compute a difference between first average intensity of the first pixel group and second average intensity of the second pixel group for being the image shading parameter. The operation processor is adapted to further compute an intensity mean value of the foresaid all pixels, and classify some pixels having the pixel intensity greater than or equal to the intensity mean value as the first pixel group, and classify other pixels having the pixel intensity smaller than the intensity mean value as the second pixel group.

According to the claimed invention, the image sensor excludes an optical lens. The optical detection device further includes a laser light source adapted to project an illumination beam onto the target object. A size of the surface treatment features is greater than or equal to an illumination range of the illumination beam projected onto the target object. The optical detection device is applied to detect whether the target object made by metal material has the different surface treatment features.

According to the claimed invention, a method of forming at least two markers includes providing a surface on a target object, and performing a surface treatment on at least two regions of the surface to form the at least two markers. The surface treatment includes a wire brushing treatment or a sandblasting treatment, a surface treatment feature of the at least two regions is different from a surface treatment feature of a range of the surface excluding the at least two regions. The markers are spaced from each other to set as barcodes or encode data.

The optical detection device of the present invention can analyze the speckle pattern in the detection image to acquire the image contrast value when the auto exposure mode is actuated or turned on, and utilize a property of the image contrast value having significant difference between different surface treatment features (such as the smooth surface or the rough surface) to analyze and find out the existence, the size, the number and the arrangement of the marker inside the detection image and the related barcodes or encode data. Comparing to the prior art, the optical detection device of the present invention can accurately and rapidly identify the marker when the auto exposure mode is actuated or turned on.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
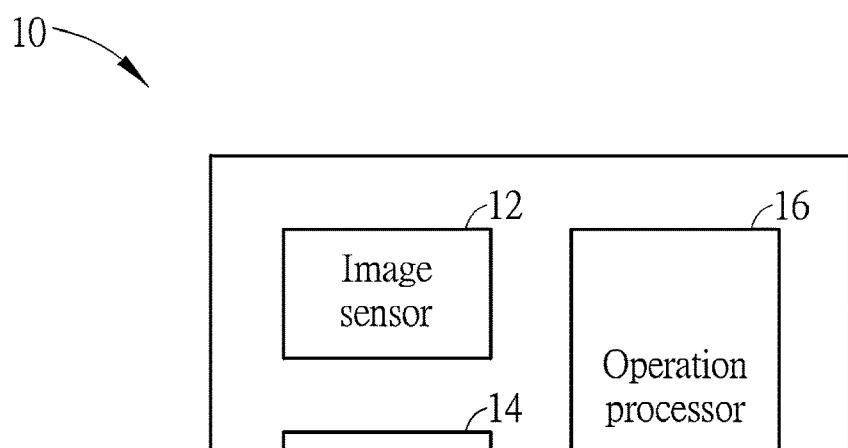
FIG. 1 is a functional block diagram of an optical detection device according to an embodiment of the present invention.
Figure 2:
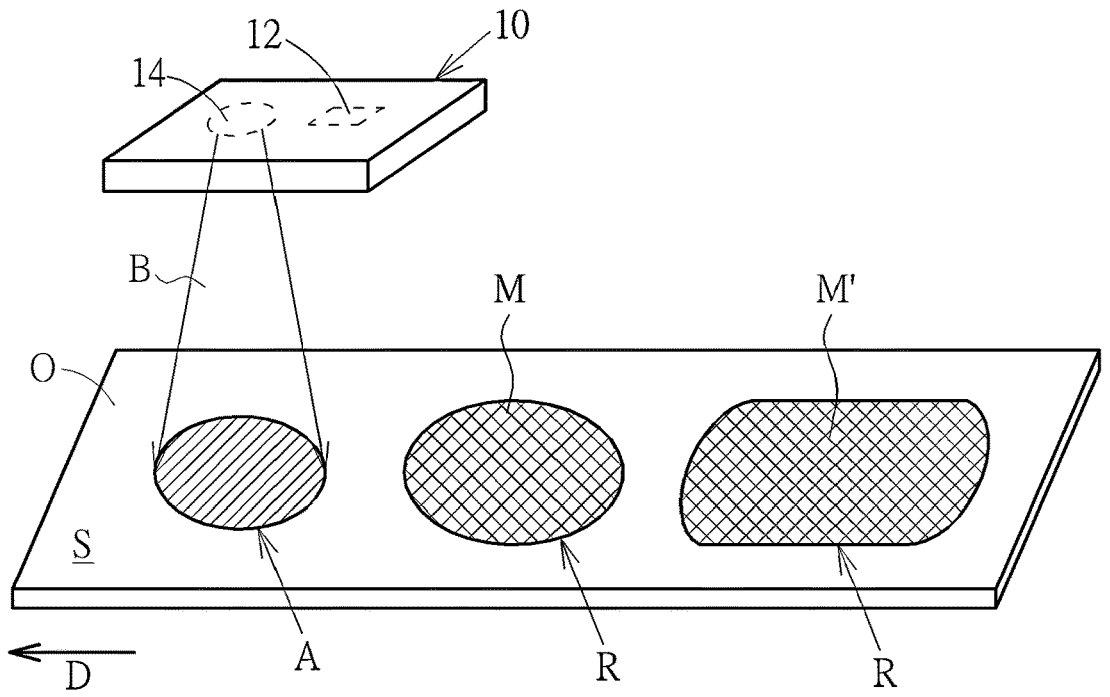
FIG. 2 is an application diagram of the optical detection device and a target object according to the embodiment of the present invention.

Please refer to FIG. 1 and FIG. 2. FIG. 1 is a functional block diagram of an optical detection device 10 according to an embodiment of the present invention. FIG. 2 is an application diagram of the optical detection device 10 and a target object O according to the embodiment of the present invention. The optical detection device 10 can detect whether the target object O has different surface treatment features. Generally, the target object O can be preferably made by metal material and the metal surface of the target object O can have a region R for special surface treatment; for example, the region R can be polished to form a smooth surface treatment feature, or can be sandblasted to form a rough surface treatment feature. The smooth surface treatment feature and the rough surface treatment feature can be defined as a marker M.

The range of the metal surface of the target object O excluding the region R cannot be processed by the special surface treatment, which means the region R and the foresaid range other than the region R of the target object O can respectively have different surface treatment features. The present invention can preferably define the surface treatment feature of the region R as the marker M. The marker M is not limited to the smooth surface treatment feature and the rough surface treatment feature as mentioned above, and depends on a design demand. The target object O is not limited to the metal material. Any material that provides different surface treatment features when being processed by the surface treatment can belong to a scope of the target object O applied for the optical detection device 10 of the present invention.

The optical detection device 10 can include an image sensor 12, a laser light source 14 and an operation processor 16. The laser light source 14 can project an illumination beam B toward the target object O. The laser light source 14 can have high directivity; therefore, a size of an illumination range A of the illumination beam B projected onto the target object O can be computed in accordance with a lighting angle of the laser light source 14 and a distance of the laser light source 14 relative to the target object O. The size of the surface treatment feature (which means the marker M) can be preferably greater than or equal to the size of the illumination range A; when the optical detection device 10 and the target object O are moved relatively, the illumination range A of the laser light source 14 can completely enter into the range of the surface treatment feature for preferred detection accuracy.

In the present invention, the image sensor 12 of the optical detection device 10 can exclude an optical lens, and the detection image which contains the target object O and acquired by the image sensor 12 may not have a clear pattern of features, but can have speckle shading variation due to characteristic difference of the surface treatment features (such as the smooth surface and/or the rough surface). The operation processor 16 of the present invention can be electrically connected to the image sensor 12 in a wire manner or in a wireless manner, and can further analyze and acquire variation of at least one image shading parameter of the detection image, and determine whether the image sensor 12 detects a boundary of the surface treatment feature in accordance with the variation of the image shading parameter. In the embodiment of the present invention, the image shading parameter can be an image contrast value of the detection image or a size of a speckle pattern within the detection image, and actual application of the image shading parameter is not limited to the above-mentioned embodiment. The image contrast value can be a degree of distinction between black blocks and white blocks of the pattern within the detection image at a specific resolution. The size of the speckle pattern can be a dimension of the block that is composed of pixels with the same or similar color within the detection image.

It should be mentioned that conventional optical detection technology has to shut down an auto exposure mode of an optical detection apparatus to limit an exposure period, for generating pixel intensity variation that can be identified, when the optical detection apparatus has not lens elements and cannot read a clear image. However, the optical detection device 10 of the present invention can clearly identify features on the region R (which means the variation of the image shading parameter, or can be represented as the image contrast value or the speckle size) processed by the special surface treatment and located on the metal surface of the target object O, without turning off the auto exposure mode of the optical detection device 10. The operation processor 16 can analyze and compute the variation of the image shading parameter on the detection image when the auto exposure mode is turned on or turned off, so as to find out the boundary of the surface treatment features for deciding whether the surface treatment feature exists, and a number and a size and distribution of the surface treatment feature.

Figures 3, 4, 5:
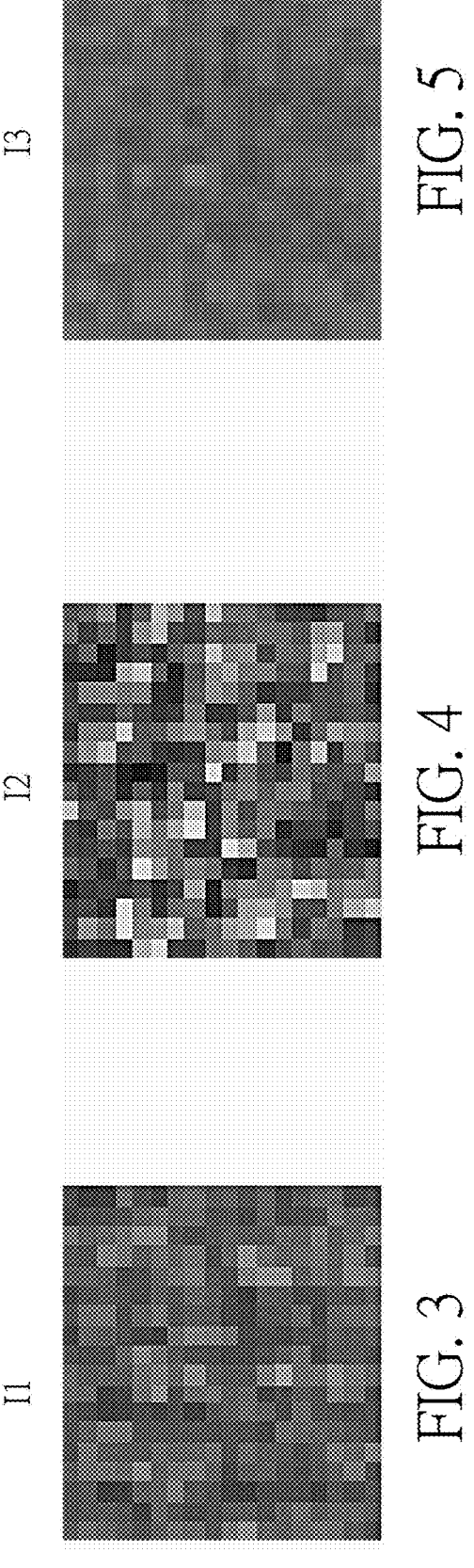
FIG. 3 to FIG. 5 are diagrams of detection images captured by the optical detection device for different target objects or different areas of the target object according to the embodiment of the present invention.
Figure 6:
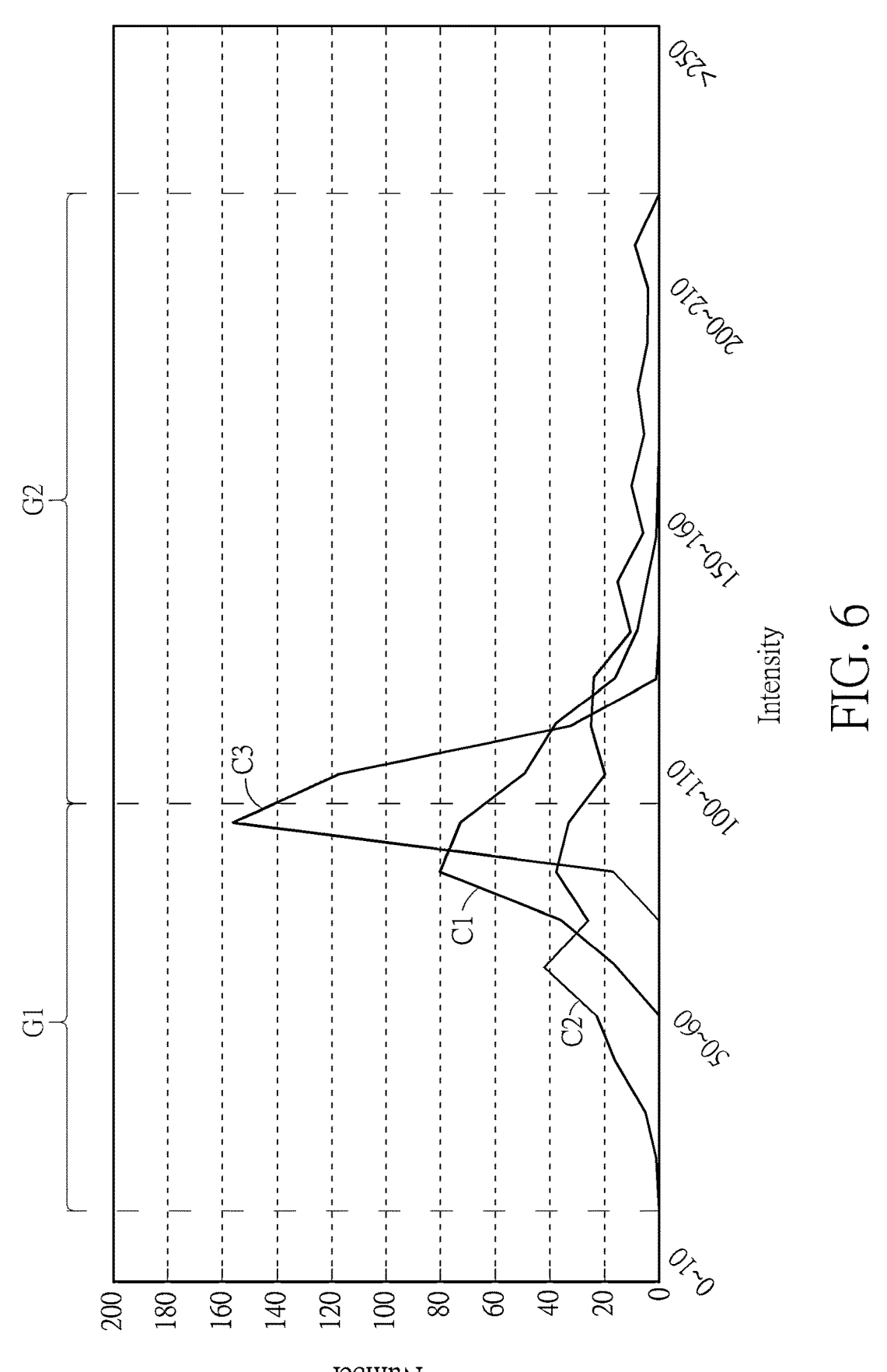
FIG. 6 is a distribution diagram of pixels in the detection images shown in FIG. 3 to FIG. 5.

Please refer to FIG. 3 to FIG. 6. FIG. 3 to FIG. 5 are diagrams of detection images I1, I2 and I3 captured by the optical detection device 10 for different target objects O or different areas of the same target object O according to the embodiment of the present invention. FIG. 6 is a distribution diagram of pixel intensity in the detection images I1, I2 and I3 shown in FIG. 3 to FIG. 5. The optical detection device 10 can capture the range of the target object O excluding the region R to acquire the detection image I1 shown in FIG. 3, and capture the region R of the target object O to acquire the detection image I2 shown in FIG. 4 or the detection image I3 shown in FIG. 5. The detection image I2 can be captured in response to the region R being polished for the special surface treatment, and the detection image I3 can be captured in response to the region R being sandblasted for the special surface treatment.

As shown in FIG. 6, a curve C1 is distribution of the pixel intensity of the detection image I1, and a curve C2 is distribution of the pixel intensity of the detection image I2, and a curve C3 is distribution of the pixel intensity of the detection image I3. The pixel intensity distribution (which means the curve C1) of the range not processed by the special surface treatment on the target object O can be set between 60~160. The pixel intensity distribution (which means the curve C2) of the region R polished for the special surface treatment on the target object O can be set between 20~220. The pixel intensity distribution (which means the curve C3) of the region R sandblasted for the special surface treatment on the target object O can be set between 80~130.

Figure 7:
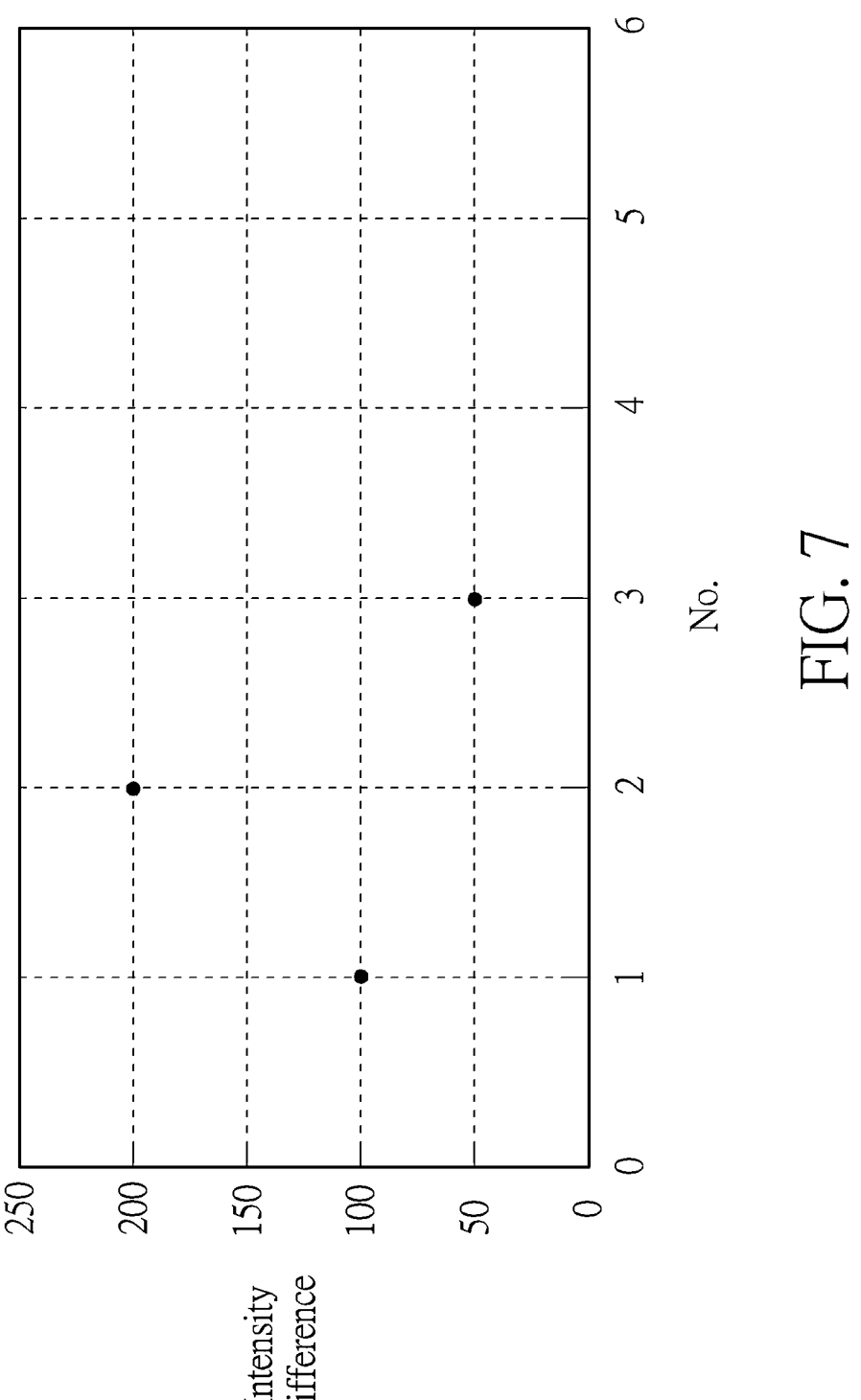
FIG. 7 is a comparison diagram of the image contrast values of the detection images according to the embodiment of the present invention.

The image shading parameter computed by the optical detection device 10 can preferably be the image contrast value of the detection image I1 (or the detection image I2 or the detection image I3). For example, a difference between a first pixel having maximum pixel intensity and a second pixel having minimum pixel intensity of the detection image I1 (or the detection image I2 or the detection image I3) can be computed and set as the image shading parameter. Please refer to FIG. 7. FIG. 7 is a comparison diagram of the image contrast values of the detection images I1, I2 and I3 according to the embodiment of the present invention. No. 1 can be represented as the intensity difference between the brightest pixel (which means the first pixel having the maximum pixel intensity) and the darkest pixel (which means the second pixel having the minimum pixel intensity) of the curve C1. No. 2 can be represented as the intensity difference between the brightest pixel and the darkest pixel of the curve C2. No. 3 can be represented as the intensity difference between the brightest pixel and the darkest pixel of the curve C3.

Besides, the optical detection device 10 may divide all pixels of the detection image I1 (or the detection image I2 or the detection image I3) into a first pixel group G1 and a second pixel group G2 in accordance with the pixel intensity of all the pixels. As shown in FIG. 6, first average intensity of the first pixel group G1 can be greater than second average intensity of the second pixel group G2. The optical detection device 10 can compute a difference between the first average intensity G1 and the second average intensity G2 (such as the difference between the first average intensity and the second average intensity) and set as the image shading parameter.

The present invention can provide several ways to define the first pixel group G1 and the second pixel group G2. For example, an intensity mean value of all the pixels can be computed for a start, and some pixels of all the pixels having the pixel intensity greater than or equal to the intensity mean value can be classified into the first pixel group G1, and other pixels of all the pixels having the pixel intensity smaller than the intensity mean value can be classified into the second pixel group G2. Moreover, all the pixels can be arranged in accordance with the pixel intensity, and a middle one of the arranged pixels can be used to divide all the pixels into the first pixel group G1 and the second pixel group G2.

Setting ways of the pixel group are not limited to the above-mentioned embodiment, and depend on the design demand.

As shown in FIG. 7, the image shading parameter (such as the intensity difference as No. 1) of the detection image I1 corresponding to the surface of the original metal material (which means the range excluding the region R) of the target object O can be obviously greater than the image shading parameter (such as the intensity difference as No. 3) of the detection image I3 corresponding to the region R (which is sandblasted for the special surface treatment) of the target object O; the image shading parameter (such as the intensity difference as No. 2) of the detection image I2 corresponding to the region R (which is polished for the special surface treatment) of the target object can be obviously greater than the image shading parameter (such as the intensity difference as No. 1) of the detection image I1.

Therefore, the present invention can set a predefined threshold according to information shown in FIG. 7; for example, the predefined threshold can be 150 or 75. Then, when the optical detection device 10 acquires one detection image, the optical detection device 10 can compute and compare the image shading parameter of the foresaid detection image with the predefined threshold. As if the image sensor 12 aligns with or faces toward the surface of the original metal material of the target object O, the image shading parameter can be computed around 100; when the image shading parameter crosses the predefined threshold, such as being over 150 or under 75, the image sensor 12 can detect the boundary of different surface treatment features on the target object O, which means the image sensor 12 can aligns with or faces toward the region R for capturing the marker M.

As mentioned above, the optical detection device 10 of the present invention can detect whether the marker M exists in accordance with a comparison result of the image shading parameter and the predefined threshold. As shown in FIG. 2, if the target object O is moved in a direction D, the optical detection device 10 can detect the image shading parameter crosses the predefined threshold to represent that the illumination range A is just overlapped with the marker M; then, the image shading parameter can be back to an initial value to represent that the illumination range A is separated from the marker M, and therefore the optical detection device 10 can decide existence of one marker M. In other possible embodiment of the present invention, the optical detection device 10 can further determine a number of times of the image shading parameter crossing the predefined threshold; for example, if the image shading parameter crosses the predefined threshold and go back to the initial value, and then crosses the predefined threshold and go back to the initial value again, the optical detection device 10 can decide existence of two markers M.

In another possible embodiment of the present invention, the optical detection device 10 can compute a period length of the image shading parameter crossing the predefined threshold. As shown in FIG. 2, if the target object O is moved in the direction D, the period length of the illumination range A overlapped with the marker M can be smaller than the period length of the illumination range A overlapped with the marker M'. The optical detection device 10 can utilize a difference between the foresaid period lengths to determine a size ratio of the marker M to the marker M'. According to the embodiments of the present invention, the optical detection device 10 can compute the number of times of the image shading parameter crossing the predefined threshold, and the period length of the image shading parameter crossing the predefined threshold and going back to the initial value, for determining the number and the size of the marker M and/or the marker M', so as to acquire barcodes or encode data represented by arrangement of the markers M and M'.

In addition, the optical detection device 10 can detect a structural feature (such as any reference point formed on the metal surface for identification) of the target object O, and analyze the structural feature to compute position change of the target object O relative to the image sensor 12 along the direction D. In the situation, if the number and the interval between the markers M on the surface of the target object O are known information, the optical detection device 10 can analyze the detection image to acquire the interval between the markers M, and utilize the intervals to calibrate the relative position change of the target object O and the image sensor 12 for accurate optical tracking data.

Figure 8:
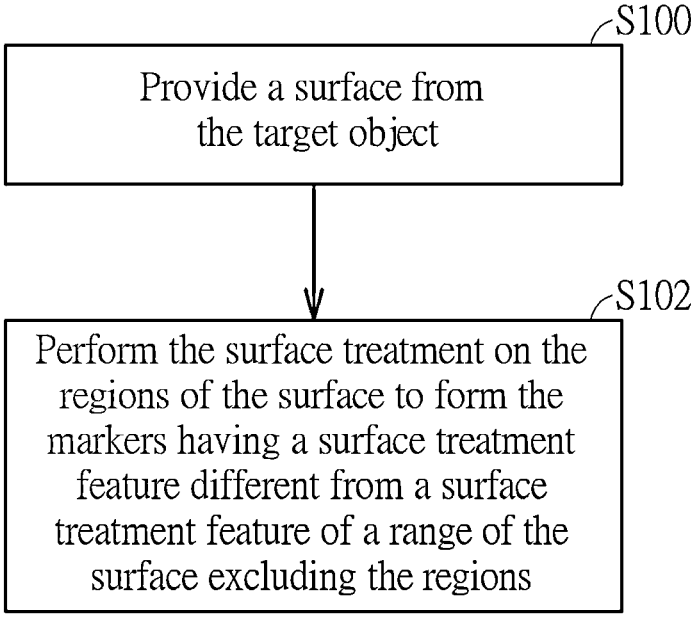
FIG. 8 is a flow chart of a method of forming the markers according to the embodiment of the present invention.

Please refer to FIG. 2 and FIG. 8. FIG. 8 is a flow chart of a method of forming the markers M according to the embodiment of the present invention. First, step S100 can be executed to provide a surface S from the target object O; the surface S can be a place of the target object O facing the optical detection device 10, and the markers M formed on the surface S can be read by the optical detection device 10. Then, step S102 can be executed to perform the surface treatment on the regions R of the surface S to form the markers M. The surface treatment can be a wire brushing treatment or a sandblasting treatment or a wool wheel polishing treatment, used to form the markers M with the smooth surface or the rough surface. For example, the wire brushing treatment or the sandblasting treatment performed on the region R can acquire the marker M rougher than the range of the surface S excluding the region R; further, the wool wheel polishing treatment performed on the region R can acquire the marker M smoother than the range of the surface S excluding the region R. Besides, the markers M can be spaced from each other to set as the barcodes or the encode data, so as to be read by the optical detection device 10 in accordance with foresaid description.

In conclusion, the optical detection device of the present invention can analyze the speckle pattern in the detection image to acquire the image contrast value when the auto exposure mode is actuated or turned on, and utilize a property of the image contrast value having significant difference between different surface treatment features (such as the smooth surface or the rough surface) to analyze and find out the existence, the size, the number and the arrangement of the marker inside the detection image and the related barcodes or encode data. Comparing to the prior art, the optical detection device of the present invention can accurately and rapidly identify the marker when the auto exposure mode is actuated or turned on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detection device of detecting whether a target object has different surface treatment features, the optical detection device comprising:

an image sensor adapted to acquire a detection image containing the target object; and an operation processor electrically connected to the image sensor, and adapted to compute variation of an image shading parameter of the detection image and further to determine whether a boundary of the surface treatment features are detected by the image sensor in accordance with the variation of the image shading parameter;

wherein the operation processor is adapted to further divide all pixels of the detection image into a first pixel group and a second pixel group in accordance with each pixel intensity of the foresaid all pixels, and compute a difference between first average intensity of the first pixel group and second average intensity of the second pixel group for being the image shading parameter;

wherein the operation processor is adapted to further compute an intensity mean value of the foresaid all pixels, and classify some pixels having the pixel intensity greater than or equal to the intensity mean value as the first pixel group, and classify other pixels having the pixel intensity smaller than the intensity mean value as the second pixel group.

2. The optical detection device of claim 1, wherein the image shading parameter is an image contrast value or a speckle size of the detection image.

3. The optical detection device of claim 1, wherein the operation processor computes the variation of the image shading parameter of the detection image when an auto exposure mode of the image sensor is actuated.

4. The optical detection device of claim 1, wherein the operation processor is adapted to further compare the image shading parameter with a predefined threshold, and determine the boundary is detected by the image sensor when the image shading parameter crosses the predefined threshold.

5. The optical detection device of claim 4, wherein the operation processor is adapted to further compute a period length of the image shading parameter crossing the predefined threshold, and utilize the period length to acquire a size of one of the surface treatment features.

6. The optical detection device of claim 4, wherein the operation processor is adapted to further compute a number of times that the image shading parameter crosses the predefined threshold, and utilize the number of times to acquire a number of the boundary detected by the image sensor.

7. The optical detection device of claim 6, wherein the operation processor is adapted to further compute a period length of the image shading parameter crossing the predefined threshold, and utilize the period length and the number of times to acquire barcodes or encode data represented by arrangement of the surface treatment features.

8. The optical detection device of claim 1, wherein the operation processor is adapted to further detect a structural feature formed on the target object for computing relative position change of the image sensor and the target object.

9. The optical detection device of claim 8, wherein the operation processor is adapted to further analyze and acquire an interval between plural boundaries of the surface treatment features, and utilize the interval to calibrate the relative position change.

10. The optical detection device of claim 1, wherein the operation processor is adapted to further compute a difference between a first pixel having maximum pixel intensity and a second pixel having minimum pixel intensity of the detection image for being the image shading parameter.

11. The optical detection device of claim 1, wherein the image sensor excludes an optical lens.

12. The optical detection device of claim 1, wherein the optical detection device further comprises a laser light source adapted to project an illumination beam onto the target object.

13. The optical detection device of claim 12, wherein a size of the surface treatment features is greater than or equal to an illumination range of the illumination beam projected onto the target object.

14. The optical detection device of claim 1, wherein the optical detection device is applied to detect whether the target object made by metal material has the different surface treatment features.

\* \* \* \* \*